United States Patent
Chang et al.

(10) Patent No.: US 8,775,735 B2
(45) Date of Patent: Jul. 8, 2014

(54) STORAGE SYSTEM AND OPERATION METHOD OF A STORAGE SYSTEM

(75) Inventors: Chen-Yu Chang, New Taipei (TW); Tun-Hong Tu, New Taipei (TW)

(73) Assignee: Synology Incorporated, Taipei (TW)

( * ) Notice: Subject to any disclaimer, the term of this patent is extended or adjusted under 35 U.S.C. 154(b) by 183 days.

(21) Appl. No.: 13/427,866

(22) Filed: Mar. 22, 2012

(65) Prior Publication Data
US 2013/0254480 A1    Sep. 26, 2013

(51) Int. Cl.
*G06F 12/00* (2006.01)

(52) U.S. Cl.
USPC .......................................... 711/114; 711/103

(58) Field of Classification Search
USPC .................................................. 711/103, 114
See application file for complete search history.

(56) References Cited

U.S. PATENT DOCUMENTS

| | | | |
|---|---|---|---|
| 8,255,641 B2* | 8/2012 | Mehra et al. | 711/154 |
| 2005/0278483 A1 | 12/2005 | Andruszkiewicz | |
| 2006/0041793 A1* | 2/2006 | Cherian et al. | 714/47 |
| 2009/0138656 A1* | 5/2009 | Liu et al. | 711/114 |

* cited by examiner

*Primary Examiner* — Aimee Li
*Assistant Examiner* — Christopher Do
(74) *Attorney, Agent, or Firm* — Winston Hsu; Scott Margo

(57) ABSTRACT

A storage system includes a redundant array of independent disks (RAID), a file subsystem, and a multiple device control unit. The RAID includes a plurality of disks and a bitmap. The file subsystem is used for executing a write command and a trim command. The multiple device control unit does not execute a first synchronization operation on the plurality of disks during the RAID is built, does not execute a second synchronization operation on expansion capacity of the plurality of disks during the RAID is expanded, executes a third synchronization operation on at least one added disk according to the blocks of the plurality of disks occupied by the data during the RAID is reshaped, and/or executes a corresponding operation on at least one added disk according to the blocks of the plurality of disks occupied by the data during the RAID is recovered.

11 Claims, 5 Drawing Sheets

STORAGE SYSTEM AND OPERATION METHOD OF A STORAGE SYSTEM

BACKGROUND OF THE INVENTION

1. Field of the Invention

The present invention is related to a storage system and an operation method of a storage system, and particularly to a storage system and an operation method of a storage system that have advantages of fast establishment, recovery, reshaping, and/or resizing.

2. Description of the Prior Art

A high level storage device is usually capable of providing a very large capacity file system and redundant array of independent disks (RAID) for a user. However, when the very large capacity file system is built in a large capacity RAID, data of the user stored in the large capacity RAID may suffer some risk in some conditions.

RAID level greater than 1 can still provide normal write and read capability when one disk of the RAID fails ("degraded"), but RAID-6 can allow at most two disks to fail. When a RAID (such as the RAID-1, the RAID-5, or the RAID-6) has a failed disk, the user can substitute the failed disk with a normal disk. Meanwhile, a program of an operation system (such as Linux) will perform a recovery process (called recovery) on the normal disk. Then, the program can store data (the same as data stored in other healthy disks) in the normal disk according to a store rule of the RAID. While the program performs the recovery process on the normal disk, the RAID is unsafe because the RAID (except for the RAID-6) can not allow another disk to fail. However, the RAID spends more time on the recovery process the greater the capacity of the RAID, which means that the RAID is unsafe for a longer time. Thus, when a file system is in a degraded RAID, risk of loss of user data of the file system is increased because the RAID may crash at any time.

SUMMARY OF THE INVENTION

An embodiment provides a storage system. The storage system includes a redundant array of independent disks (RAID), a file subsystem, and a multiple device control unit. The RAID includes a plurality of disks and a bitmap. The file subsystem is used for executing a write command to write data in blocks of the plurality of disks of the RAID, and executing a trim command to notify the RAID to release blocks of the plurality of disks of the RAID corresponding to the trim command. The multiple device control unit is used for not executing a first synchronization operation on the plurality of disks during the RAID is built, not executing a second synchronization operation on expansion capacity of the plurality of disks during the RAID is expanded, executing a third synchronization operation on the plurality of disks according to the blocks of the plurality of disks of the RAID occupied by the data during the RAID is reshaped, and/or executing a corresponding operation on at least one added disk according to the blocks of the plurality of disks of the RAID occupied by the data during the RAID is recovered. The bitmap is used for recording the blocks occupied by the data.

Another embodiment provides an operation method of a storage system, and the storage system comprising a RAID, a file subsystem, and a multiple device control unit, where the RAID includes a plurality of disks and a bitmap. The operation method includes the multiple device control unit not executing a first synchronization operation on the plurality of disks and reserving a predetermined block of each disk of the plurality of disks for the bitmap during the RAID is built; the file subsystem writing data in blocks of the plurality of disks of the RAID; the bitmap recording the blocks of the plurality of disks of the RAID occupied by the data after the RAID is built; determining whether the RAID is healthy; and the multiple device control unit executing a corresponding operation if the RAID is unhealthy.

The present invention provides a storage system. The storage system utilizes a multiple device control unit not executing a first synchronization operation on a plurality of disks during a RAID is built, not executing a second synchronization operation on expansion capacity of the plurality of disks during the RAID is expanded, executing a third synchronization operation on at least one added disk according to blocks of the plurality of disks of the RAID occupied by data during the RAID is reshaped, and/or executing a data recovery operation on at least one added disk according to blocks of the plurality of disks of the RAID occupied by data during the RAID is recovered. In addition, the storage system utilizes a bitmap to record blocks of the plurality of disks of the RAID occupied by data. Compared to the prior art, the present invention not only can reduce risk of user data of a RAID during the RAID is degraded, but can also save time and power during the RAID is resized, reshaped, and/or resynchronized.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
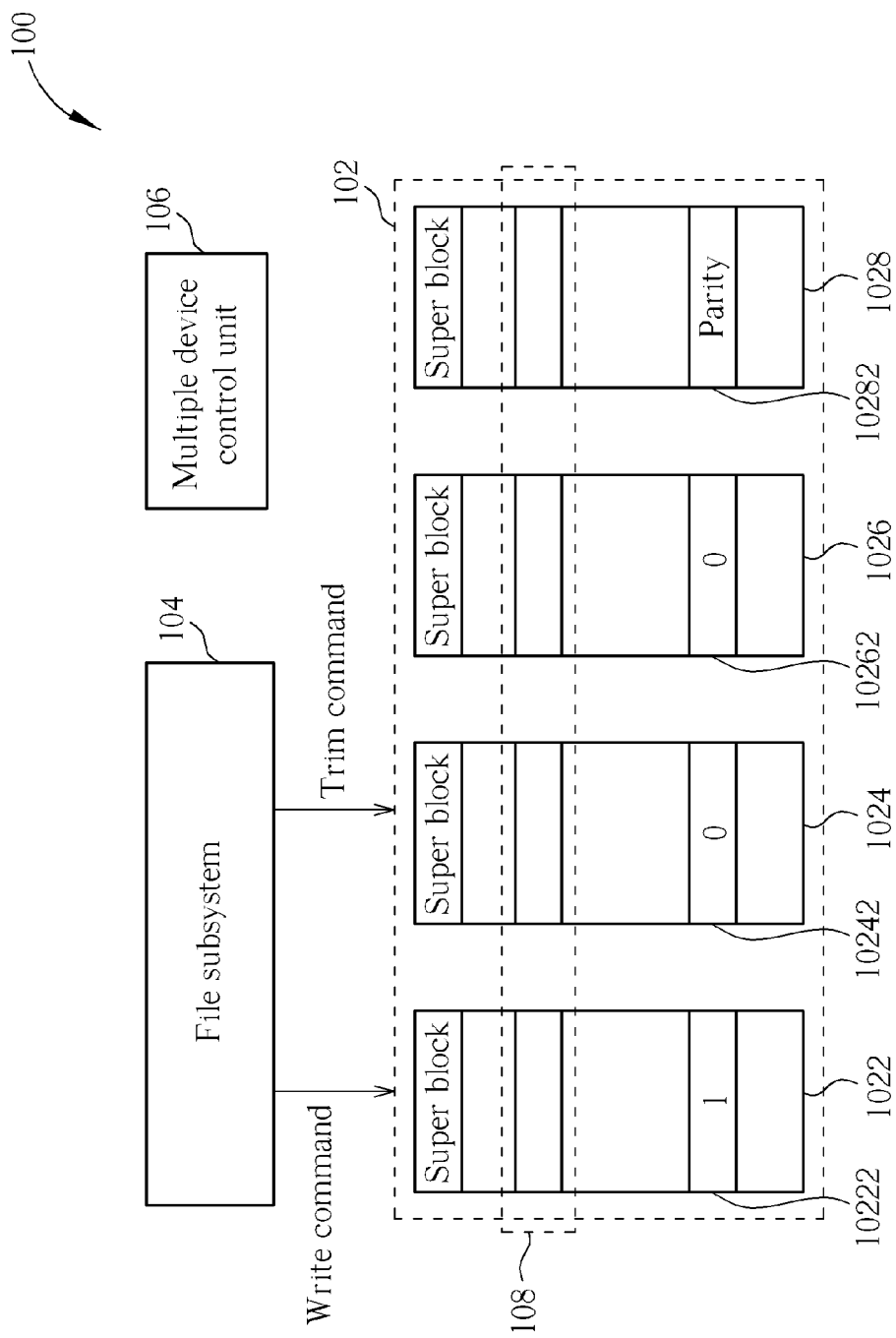
FIG. 1 is a diagram illustrating a storage system according to an embodiment.

Please refer to FIG. 1. FIG. 1 is a diagram illustrating a storage system 100 according to an embodiment. The storage system 100 includes a redundant array of independent disks (RAID) 102, a file subsystem 104, and a multiple device control unit 106. But, the present invention is not limited to the storage system 100 including the file subsystem 104. The RAID 102 is a RAID-5 and includes disks 1022, 1024, 1026, and 1028, and a bitmap 108. But, the present invention is not limited to the RAID 102 being the RAID-5 and including the disks 1022, 1024, 1026, and 1028. That is to say, the RAID 102 can be a RAID-1, the RAID-5, or a RAID-6 and number of disks included by the RAID 102 depends on a type of the RAID 102. For example, if the RAID 102 is the RAID-1, the RAID 102 includes at least two disks; if the RAID 102 is the RAID-5, the RAID 102 includes at least three disks; and if the RAID 102 is the RAID-6, the RAID 102 includes at least four disks. The RAID-1, RAID-5, and RAID-6 have different store rules, respectively. In addition, the present invention can be applied to any RAID type which can allow failing at least one disk. The file subsystem 104 is used for executing a write command to write data in blocks of the disks 1022, 1024, 1026, and 1028 of the RAID 102 simultaneously according to the store rule of the RAID-5, and executing a trim command to notify the RAID 102 to release blocks of the disks 1022, 1024, 1026, and 1028 of the RAID 102 corresponding to the trim command. In addition, the file subsystem 104 also supports the trim command.

As shown in FIG. 1, a predetermined block of each disk of the disks 1022, 1024, 1026, and 1028 is reserved for the bitmap 108, and the bitmap 108 is used for recording blocks of the disks 1022, 1024, 1026, and 1028 occupied by data, where a predetermined block of each disk is behind a superblock of a head of each disk.

As shown in FIG. 1, the multiple device control unit 106 does not execute a first synchronization operation on the disks 1022, 1024, 1026, and 1028 during the RAID 102 is built. After the RAID 102 is built, during the file subsystem 104 executes a write command to write data "1", "0", "0", and "Parity" in the RAID 102, the data "1", "0", "0", and "Parity" are simultaneously written in the same stripes 10222, 10242, 10262, and 10282 of the disks 1022, 1024, 1026, and 1028, respectively, (as shown in FIG. 1) according to the store rule of the RAID 102 (that is, the store rule of the RAID-5), where the data "Parity" is generated by the data "1", "0", and "0". That is to say, when the data "1", "0", "0", and "Parity" are simultaneously written in the same stripes 10222, 10242, 10262, and 10282, respectively, the same stripes 10222, 10242, 10262, and 10282 are automatically synchronized, so the multiple device control unit 106 does not execute the first synchronization operation on the disks 1022, 1024, 1026, and 1028 during the RAID 102 is built.

Figure 2:
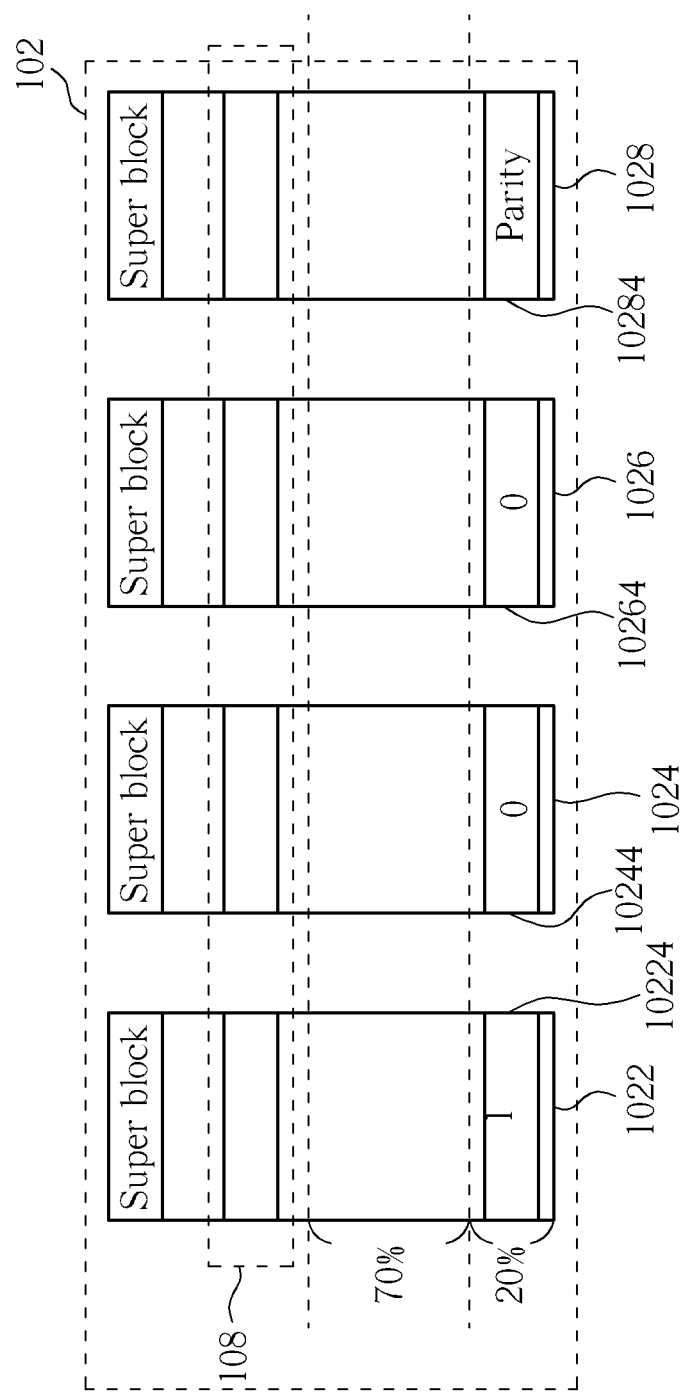
FIG. 2 is a diagram illustrating the multiple device control unit not executing a second synchronization operation on expansion capacity of the disks during the RAID is expanded.

Please refer to FIG. 2. FIG. 2 is a diagram illustrating the multiple device control unit 106 not executing a second synchronization operation on expansion capacity of the disks 1022, 1024, 1026, and 1028 during the RAID 102 is expanded. As shown in FIG. 2, at first 70% capacity of the disks 1022, 1024, 1026, and 1028 can be utilized to store data. Then, capacity of the disks 1022, 1024, 1026, and 1028 utilized to store data is expanded to 90%. Meanwhile, the multiple device control unit 106 does not execute the second synchronization operation on expansion capacity (20% capacity) of the disks 1022, 1024, 1026, and 1028. When data "1", "0", "00", and "Parity" are written in the same stripes 10224, 10244, 10264, and 10284 of the expansion capacity (20% capacity) of the disks 1022, 1024, 1026, and 1028, the same stripes 10224, 10244, 10264, and 10284 of the disks 1022, 1024, 1026, and 1028 are automatically synchronized, so the multiple device control unit 106 does not need to execute the second synchronization operation on the expansion capacity of the disks 1022, 1024, 1026, and 1028 during the RAID 102 is expanded, where the data "Parity" is generated by the data "1", "0", and "0".

Figure 3:
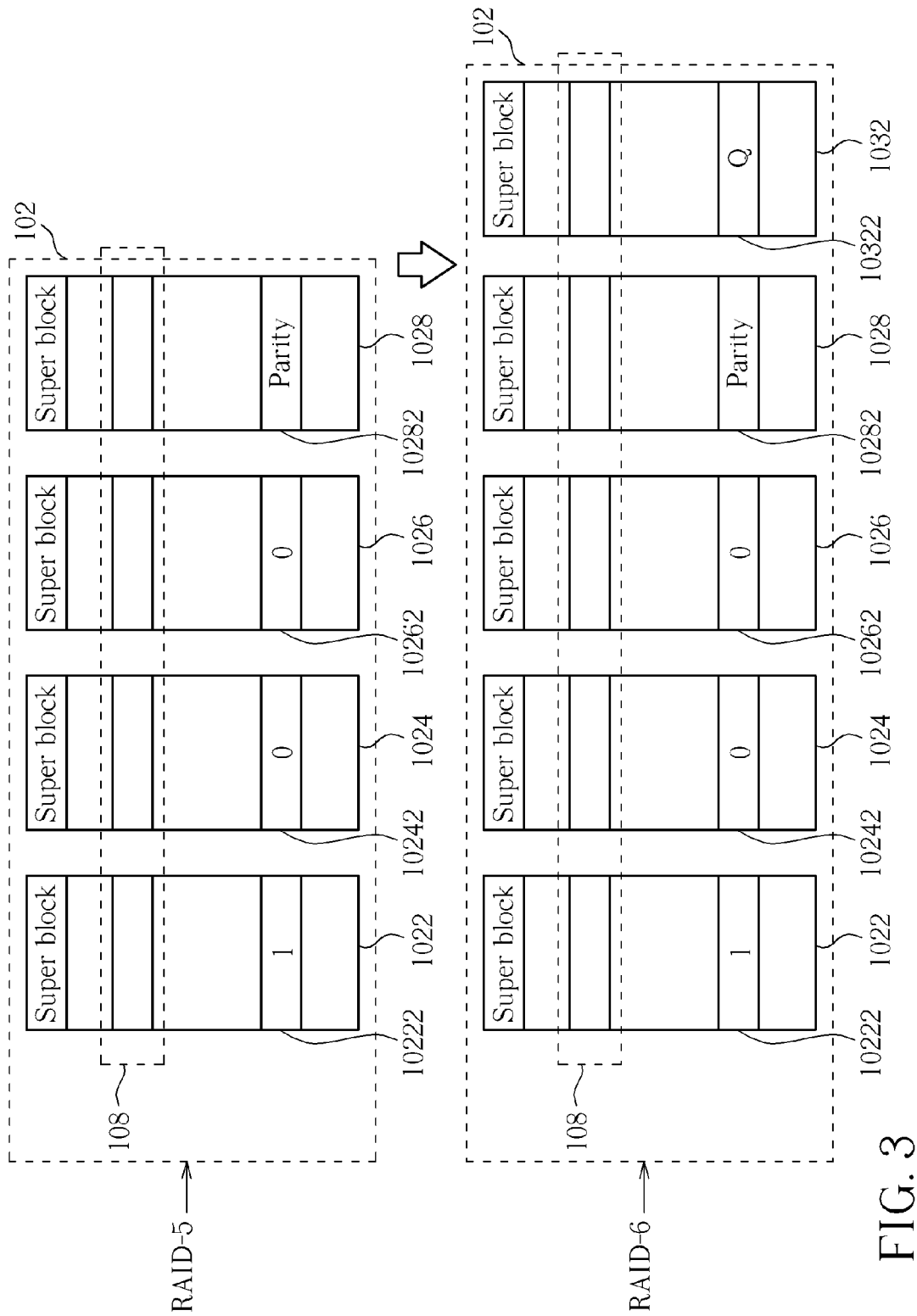
FIG. 3 is a diagram illustrating the multiple device control unit executing a third synchronization operation on an added disk during the RAID is reshaped.

Please refer to FIG. 3. FIG. 3 is a diagram illustrating the multiple device control unit 106 executing a third synchronization operation on an added disk 1032 during the RAID 102 is reshaped. But, the present invention is not limited to only adding the disk 1032 to reshape the RAID 102. That is to say, at least one disk can be added to reshape the RAID 102. As shown in FIG. 3, the same stripes 10222, 10242, 10262 and 10282 of the disks 1022, 1024, 1026, and 1028 are utilized to store data "1", "0", "0", and "Parity", respectively. During the RAID 102 is reshaped from the RAID-5 to RAID-6, the multiple device control unit 106 executes the third synchronization operation on a stripe 10322 of the disk 1032 corresponding to the same stripes 10222, 10242, 10262, and 10282 of the RAID 102 occupied by the data "1", "0", "0", and "Parity", according to the bitmap 108. That is to say, the multiple device control unit 106 can know that the same stripes 10222, 10242, 10262 and 10282 store the data "1", "0", "0", and "Parity", respectively through the bitmap 108, so the multiple device control unit 106 can execute the third synchronization operation on the stripe 10322 of the disk 1032 according to the bitmap 108. After the multiple device control unit 106 executes the third synchronization operation on the stripe 10322 of the disk 1032, the same stripes 10222, 10242, 10262, 10282, and 10322 store the data "1", "0", "0", "Parity", "Q", respectively, where the datum "Q" is generated according to the data "1", "0", "0", and a predetermined algorithm of the RAID-6. In addition, because the multiple device control unit 106 knows that other stripes of the disks 1022, 1024, 1026, and 1028 of the RAID 102 do not store data according to the bitmap 108, the multiple device control unit 106 does not execute the third synchronization operation on other stripes of the disk 1032.

Figure 4:
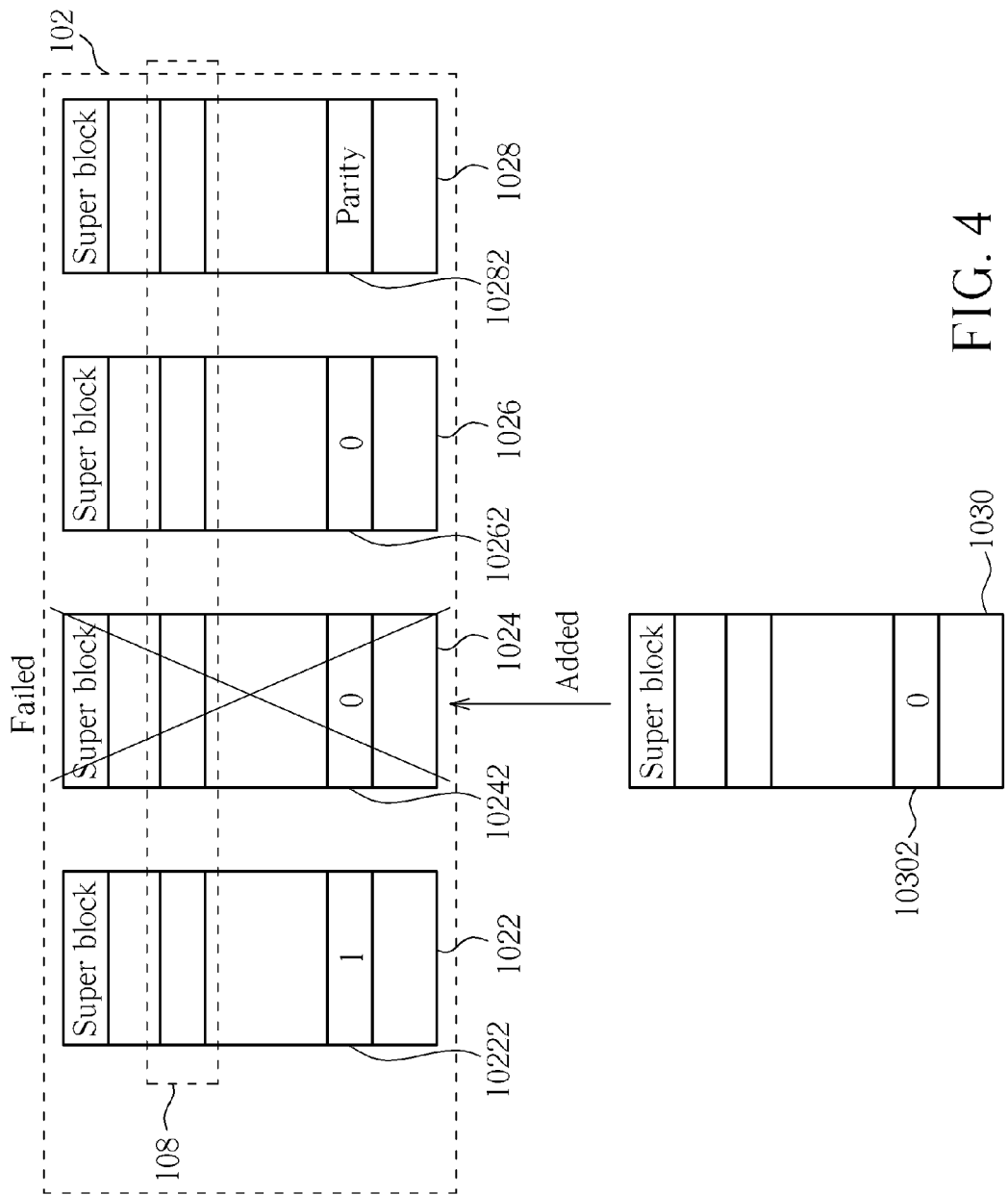
FIG. 4 is a diagram illustrating the multiple device control unit executing a data recovery operation on an added disk during the RAID is recovered.

Please refer to FIG. 4. FIG. 4 is a diagram illustrating the multiple device control unit 106 executing a data recovery operation on an added disk 1030 during the RAID 102 is recovered. But, the present invention is not limited to only adding the disk 1030 to recover the RAID 102. That is to say, at least one disk can be added to recover the RAID 102. As shown in FIG. 4, the same stripes 10222, 10242, 10262 and 10282 of the disks 1022, 1024, 1026, and 1028 are utilized to store data "1", "0", "0", and "Parity", respectively. If the disk 1024 fails, the RAID 102 is degraded. Therefore, the disk 1030 is utilized to recover the RAID 102. When the disk 1030 is added to the RAID 102, because the multiple device control unit 106 knows that the same stripes 10222, 10242, 10262 and 10282 of the disks 1022, 1024, 1026, and 1028 store the data "1", "0", "0", and "Parity", respectively through the bitmap 108, the multiple device control unit 106 can execute the data recovery operation on the disk 1030 according to the data "1", "0", and "Parity" stored in the same stripes 10222, 10262, and 10282, respectively. After the multiple device control unit 106 executes the data recovery operation on the disk 1030, a stripe 10302 of the disk 1030 corresponding to the same stripes 10222 and 10262 stores "0". That is to say, the RAID 102 becomes healthy again by adding the disk 1030. However, if the bitmap 108 is turned off, the multiple device control unit 106 may spend more time to execute the full data recovery operation on the disk 1030.

Figure 5:
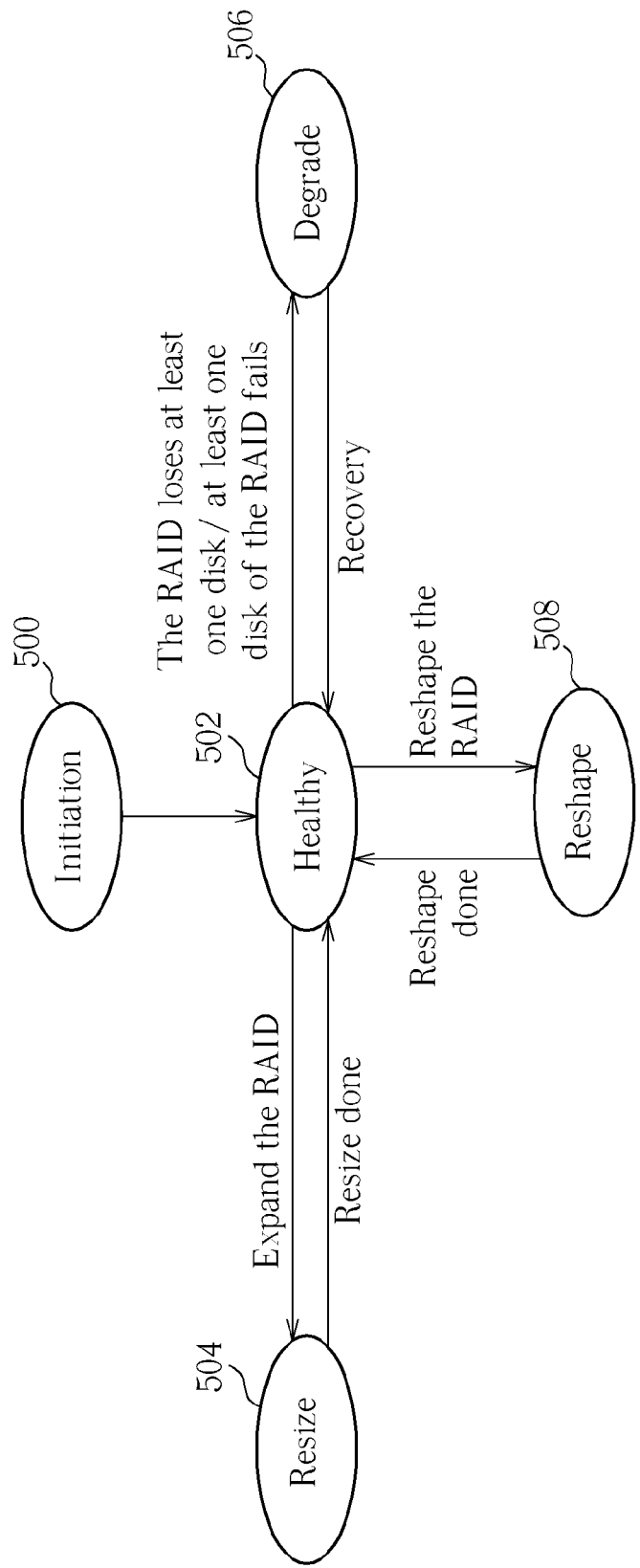
FIG. 5 is a state diagram illustrating the RAID.

Please refer to FIG. 1, FIG. 2, FIG. 3, FIG. 4, and FIG. 5. FIG. 5 is a state diagram illustrating the RAID 102. The state diagram in FIG. 5 is illustrated using the storage system 100 in FIG. 1, FIG. 2, FIG. 3, and FIG. 4. Detailed states are illustrated as follows:

State 500 is an "Initiation" state. In State 500, the multiple device control unit 106 does not execute a first synchronization operation on the disks 1022, 1024, 1026, and 1028 and reserves a predetermined block of each disk of the disks 1022, 1024, 1026, and 1028 for the bitmap 108 during the RAID 102 is built. After State 500, the RAID 102 enters State 502 ("Healthy" state). In State 502, the RAID 102 can execute some normal operation according to a user command. For example, as shown in FIG. 1, the file subsystem 104 writes data "1", "0", "0", and "Parity" in the same stripes 10222, 10242, 10262 and 10282 of the disks 1022, 1024, 1026, and 1028 of the RAID 102, respectively according to a write command. When the file subsystem 104 simultaneously writes the data "1", "0", "0", and "Parity" in the same stripes 10222, 10242, 10262, and 10282, respectively, the same stripes 10222, 10242, 10262, and 10282 are automatically synchronized, and the bitmap 108 records the same stripes 10222, 10242, 10262 and 10282 occupied by the data "1", "0", "0", and "Parity". Because the same stripes 10222, 10242, 10262, and 10282 are automatically synchronized, as illustrated in State 500, the multiple device control unit 106 does not execute a first synchronization operation on the disks 1022, 1024, 1026, and 1028.

If the RAID 102 is expanded, the RAID 102 enters State 504 ("Resize" state) from State 502. After the capacity of the disks 1022, 1024, 1026, and 1028 utilized to store data is expanded from 70% to 90% (as shown in FIG. 2), the RAID 102 can return to State 502 from State 504. For example, as shown in FIG. 2, when capacity of the disks 1022, 1024, 1026, and 1028 utilized to store data is expanded from 70% to 90%, the multiple device control unit 106 does not execute the second synchronization operation on expansion capacity (20% capacity) of the disks 1022, 1024, 1026, and 1028. When data "1", "0", "0", and "Parity" are written in the same stripes 10224, 10244, 10264, and 10284 of the expansion capacity of the disks 1022, 1024, 1026, and 1028, the same stripes 10224, 10244, 10264, and 10284 of the disks 1022, 1024, 1026, and 1028 are automatically synchronized, so the multiple device control unit 106 does not need to execute the second synchronization operation on the expansion capacity of the disks 1022, 1024, 1026, and 1028 where the data "Parity" is generated by the data "1", "0", and "0".

In State 502, if the disk 1024 of the RAID 102 fails or the RAID 102 loses the disk 1024 (as shown in FIG. 4), the RAID 102 enters State 506 ("Degrade" state) from State 502. Meanwhile, the user can add the disk 1030 to recover the RAID 102 from State 506 to State 502. As shown in FIG. 4, the disk 1030 is added to recover the RAID 102 because the disk 1024 fails or the RAID 102 loses the disk 1024. Then, the multiple device control unit 106 can execute the data recovery operation on the disk 1030 according to the data "1", "0", and "Parity" stored in the same stripes 10222, 10262, and 10282, respectively. After the multiple device control unit 106 executes the data recovery operation on the disk 1030, the stripe 10302 of the disk 1030 corresponding to the same stripes 10222, 10262, and 10282 stores a datum "0". That is to say, the RAID 102 enters State 502 ("Healthy" state) again through adding the disk 1030. However, if the bitmap 108 is turned off, the multiple device control unit 106 may spend more time to execute the full data recovery operation on the disk 1030.

In State 502, if the RAID 102 is reshaped from the RAID-5 to RAID-6, the RAID 102 enters State 508 ("Reshape" state) from State 502. Then, the user can add the disk 1032 to reshape the RAID 102. But, the present invention is not limited to only adding the disk 1032 to reshape the RAID 102. That is to say, at least one disk can be added to reshape the RAID 102. After the RAID 102 is reshaped, the RAID 102 can enter State 502 again. For example, as shown in FIG. 3, the same stripes 10222, 10242, 10262 and 10282 of the disks 1022, 1024, 1026, and 1028 are utilized to store data "1", "0", "0", and "Parity", respectively. During the RAID 102 is reshaped from the RAID-5 to RAID-6, the multiple device control unit 106 executes the third synchronization operation on the stripe 10322 of the disk 1032 corresponding to the same stripes 10222, 10242, 10262, and 10282 of the RAID 102 occupied by the data "1", "0", "0", and "Parity", according to the bitmap 108. Therefore, the multiple device control unit 106 can execute the third synchronization operation on the stripe 10322 of the disk 1032 according to the bitmap 108. After the multiple device control unit 106 executes the third synchronization operation on the stripe 10322 of the disk 1032, the same stripes 10222, 10242, 10262, 10282, and 10322 store the data "1", "0", "0", "Parity", "Q", respectively, where "Q" is generated according to the data "1", "0", "0", and a predetermined algorithm of the RAID-6. In addition, because the multiple device control unit 106 knows that other stripes of the disks 1022, 1024, 1026, and 1028 of the RAID 102 do not store data according to the bitmap 108, the multiple device control unit 106 does not execute the third synchronization operation on other stripes of the disk 1032. After the RAID 102 is reshaped from the RAID-5 to RAID-6, the RAID 102 can enter State 502 again.

To sum up, the storage system utilizes the multiple device control unit not executing the first synchronization operation on the plurality of disks during the RAID is built, not executing the second synchronization operation on expansion capacity of the plurality of disks during the RAID is expanded, executing the third synchronization operation on at least one added disk according to blocks of the plurality of disks of the RAID occupied by data during the RAID is reshaped, and/or executing the data recovery operation on at least one added disk according to blocks of the plurality of disks of the RAID occupied by data during the RAID is recovered. In addition, the storage system utilizes the bitmap to record blocks of the plurality of disks of the RAID occupied by data. Compared to the prior art, the present invention not only can reduce risk of user data of the RAID during the RAID is degraded, but can also save time and power during the RAID is resized, reshaped, and/or resynchronized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A storage system, comprising:
   a redundant array of independent disks (RAID) comprising a plurality of disks and a bitmap;
   a file subsystem for executing a write command to write data in blocks of the plurality of disks of the RAID, and executing a trim command to notify the RAID to release blocks of the plurality of disks of the RAID corresponding to the trim command; and
   a multiple device control unit for not executing a first synchronization operation on the plurality of disks during the RAID is built, not executing a second synchronization operation on expansion capacity of the plurality of disks during the RAID is expanded, executing a third synchronization operation initially at a first initial address of blocks of at least one added disk corresponding to the blocks of the plurality of disks of the RAID occupied by the data according the bitmap during the RAID is reshaped, and/or executing a data recovery operation initially at a second initial address of blocks of at least one added disk corresponding to the blocks of the plurality of disks of the RAID occupied by the data according the bitmap during the RAID is recovered;
   wherein the bitmap is used for recording the blocks occupied by the data, and the first initial address and the second initial address are not fixed according the bitmap.

2. The storage system of claim 1, wherein a predetermined block of each disk of the plurality of disks is reserved for the bitmap.

3. The storage system of claim 1, wherein the file subsystem supports a trim command.

4. The storage system of claim 1, wherein the RAID is a RAID-1.

5. The storage system of claim 1, wherein the RAID is a RAID-5.

6. The storage system of claim 1, wherein the RAID is a RAID-6.

7. An operation method of a storage system, the storage system comprising a RAID, a file subsystem, and a multiple device control unit, wherein the RAID comprises a plurality of disks and a bitmap, the operation method comprising:
the multiple device control unit not executing a first synchronization operation on the plurality of disks and reserving a predetermined block of each disk of the plurality of disks for the bitmap during the RAID is built;
the file subsystem writing data in blocks of the plurality of disks of the RAID;
the bitmap recording blocks of the plurality of disks of the RAID occupied by the data after the RAID is built; and
the multiple device control unit not executing a second synchronization operation on expansion capacity of the plurality of disks during the RAID is expanded.

8. An operation method of a storage system, the storage system comprising a RAID, a file subsystem, and a multiple device control unit, wherein the RAID comprises a plurality of disks and a bitmap, the operation method comprising:
the multiple device control unit not executing a first synchronization operation on the plurality of disks and reserving a predetermined block of each disk of the plurality of disks for the bitmap during the RAID is built;
the file subsystem writing data in blocks of the plurality of disks of the RAID;
the bitmap recording the blocks of the plurality of disks of the RAID occupied by the data after the RAID is built; and
the multiple device control unit executing a data recovery operation initially at an initial address of blocks of at least one added disk corresponding to the blocks of the plurality of disks of the RAID occupied by the data according to the bitmap during the RAID is recovered.

9. An operation method of a storage system, the storage system comprising a RAID, a file subsystem, and a multiple device control unit, wherein the RAID comprises a plurality of disks and a bitmap, the operation method comprising:
the multiple device control unit not executing a first synchronization operation on the plurality of disks and reserving a predetermined block of each disk of the plurality of disks for the bitmap during the RAID is built;
the file subsystem writing data in blocks of the plurality of disks of the RAID;
the bitmap recording the blocks of the plurality of disks of the RAID occupied by the data after the RAID is built; and
the multiple device control unit executing a third synchronization operation initially at an initial address of blocks of at least one added disk corresponding to the blocks of the plurality of disks of the RAID occupied by data according to the bitmap during the RAID is reshaped.

10. The operation method of claim 7, 8, or 9, further comprising:
the file subsystem executing a trim command to notify the RAID to release blocks of the plurality of disks of the RAID corresponding to the trim command.

11. The operation method of claim 7, 8, or 9, wherein a predetermined block of each disk of the plurality of disks is reserved for the bitmap.

* * * * *